United States Patent [19]

Tew

[11] Patent Number: 5,015,948

[45] Date of Patent: * May 14, 1991

[54] TRANSDUCER FOR PROVIDING A POSITION SIGNAL AND TRANSDUCER TEMPERATURE

[75] Inventor: Sydney K. Tew, New Baltimore, Mich.

[73] Assignee: Cadillac Gage Textron Inc., Warren, Mich.

[*] Notice: The portion of the term of this patent subsequent to Aug. 15, 2006 has been disclaimed.

[21] Appl. No.: 341,835

[22] Filed: Apr. 24, 1989

[51] Int. Cl.$^5$ .................. G01B 7/14; G01N 27/72; G01R 33/00
[52] U.S. Cl. .................... 324/207.23; 324/207.25; 324/227; 324/233
[58] Field of Search ............. 324/207, 208, 225, 227, 324/233, 207.11, 207.12, 207.13, 207.15, 207.16, 207.23, 207.25; 336/30, 45; 340/870.31

[56] References Cited

U.S. PATENT DOCUMENTS

| | | | |
|---|---|---|---|
| 2,452,156 | 10/1948 | Schover | 324/207.17 |
| 4,095,469 | 6/1978 | Yamada et al. | 324/225 |
| 4,103,233 | 7/1978 | Timmermans et al. | 324/208 |
| 4,757,259 | 7/1988 | Charpentier | 324/227 |
| 4,857,824 | 8/1989 | Tew | 324/208 |

Primary Examiner—Walter E. Snow
Attorney, Agent, or Firm—John C. Evans

[57] ABSTRACT

A two wire transducer and associated circuit processes an output voltage of the transducer to produce a first signal proportional to the position of a non-contacting movable core and to produce a second signal proportional to the temperature of operation of the transducer. The associated circuit includes an excitation source or current driver which provides a fixed frequency sinusoidal constant current across the transducer coil; and first and second demodulator circuits respectively extract position and temperature signals from the voltage developed across the coil of the transducer device. Thus, both temperature and position information are provided by a single device over a single pair of leads.

8 Claims, 3 Drawing Sheets

FIG 1
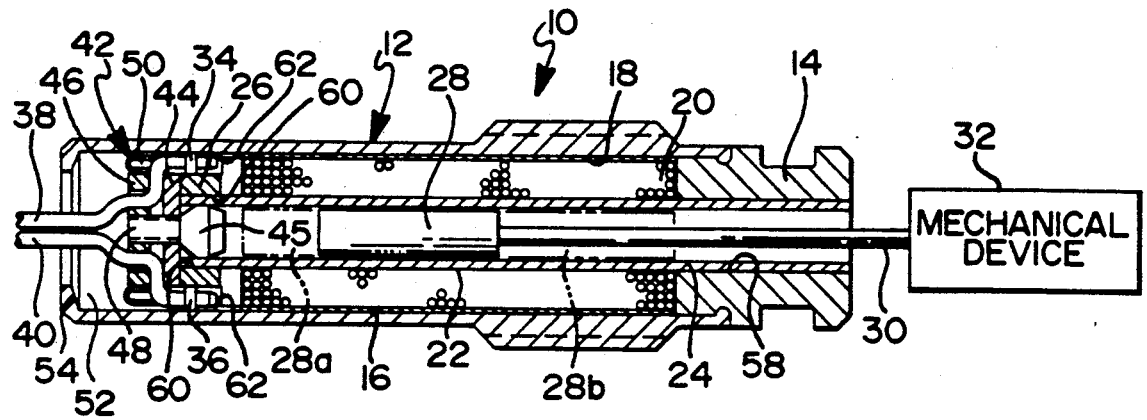
FIG 1A
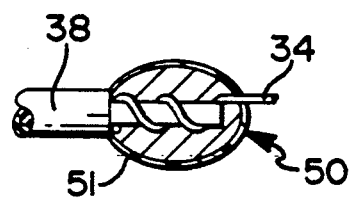
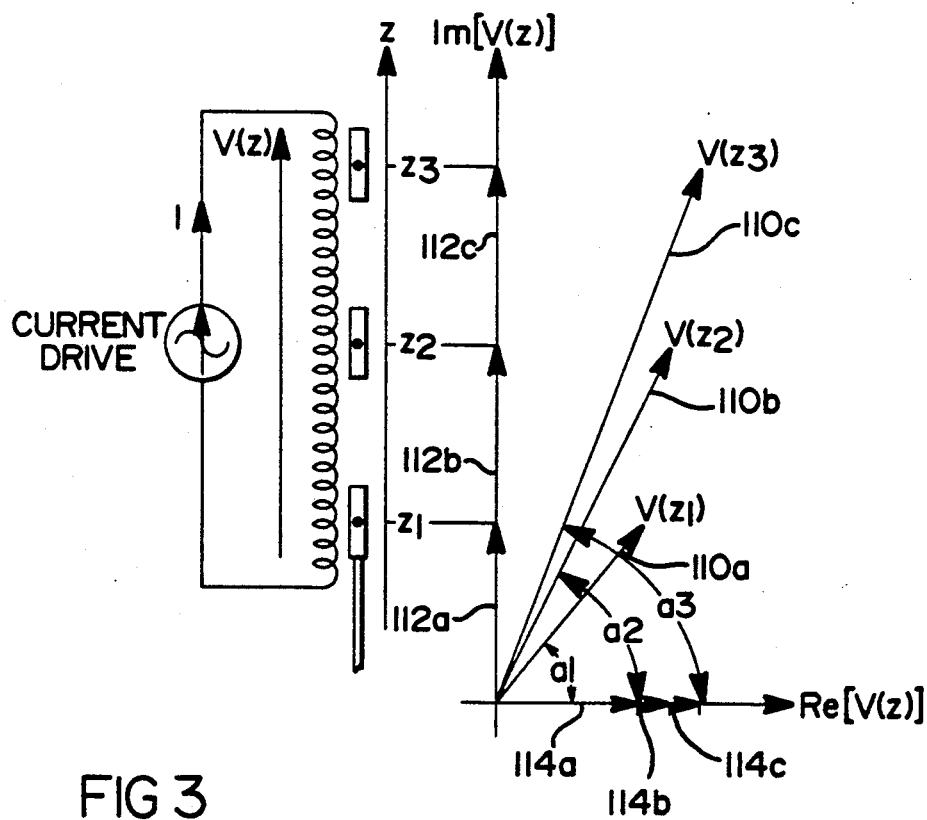
FIG 3

TRANSDUCER FOR PROVIDING A POSITION SIGNAL AND TRANSDUCER TEMPERATURE

This invention relates to temperature and position sensors and more particularly to position transducers which measure the linear displacement of a body by connecting the body to a movable rod or core inductively coupled to a fixed coil which is excited by a reference signal and which will produce an output signal corresponding to the position of the rod within the fixed coil.

RELATED PRIOR ART

U.S. Pat. No. 4,103,233 discloses a two wire transducer which has a movable rod corresponding to the control rod of a nuclear reactor. The device is associated with a meter having a signal that varies linearly with changes in the inductance in the coil due to changes in position of the rod. There is no suggestion to provide circuits associated with the transducer operative to produce both a position signal and a temperature signal.

Great Britain Patent Number 21159929B discloses a two wire position transducer having a movable core which varies the inductance of the coil. Associated circuit components measure the changes in the inductance of the coil to indicate the relative penetration of the rod core into the coil. There is no suggestion that the device be used to provide both a position signal and a temperature signal corresponding to the operational temperature of the device.

SUMMARY OF THE INVENTION

A feature of the present invention is to provide a two wire transducer and circuit assembly which will provide a measured temperature signal and a measured position signal across a single pair of leads.

Another feature of the present invention is to reduce the size of transducers by providing a coil winding configuration having only two leads across which position signals are generated and a core length related to the winding pattern of the coil which will produce a linear signal for all positions of the core as it is stroked from an initial position aligned with one end of the coil and from a final position aligned with the opposite end of the coil and wherein the core remains fully positioned within the coil throughout all of its stroke positions.

Another feature of the present invention is to provide a two wire transducer and associated circuit components to produce a first signal of the operating temperature of the transducer and a second signal of the position of a moveable core of the transducer by processing the voltage across a coil winding which is inductively coupled to the reciprocating core to vary the inductance of the coil in accordance with the position that the core assumes within the coil during operation of the transducer. The voltage across the coil is received by associated circuit means for extracting the real component of the voltage across the coil as a signal of the operating temperature of the transducer and for extracting the imaginary component of the voltage across the coil as a signal of the measured position of the core within the coil.

Another feature of the present invention is to provide a two wire transducer and associated circuits wherein the associated circuits include a first demodulator having a sine voltage reference and a second demodulator having a cosine voltage reference. The first demodulator and second demodulator receive the output voltage generated across the coil as the core moves relative thereto and the output of the first demodulator is a signal including the measured temperature of the transducer and the measured position of the coil and wherein the output of the second demodulator is a signal including the measured position of the coil.

Yet another feature of the present invention is to provide a two wire transducer and associated circuit of the preceding paragraph wherein the measured position of the core is extracted from the output voltage of the second demodulator and a summing junction is provided to subtract the extracted measure position from the output of the first demodulator to extract a measured temperature of the transducer.

In a particular embodiment of the invention the transducer has a housing which supports a single winding around a bore liner with a wire density selected to produce a linear output signal of the position of a core within the bore liner. The winding is covered by a split ferromagnetic shield. The housing and end cap combine to protect the internal components of the transducer. The bore liner is made of magnetically non-permeable and electrically insulating material. One end of the bore liner is closed by a plug and a quill is directed through an opposite open end of the bore liner to connect to a core reciprocated by the quill with respect to the single winding. The core is made from a magnetically permeable alloy.

A header assembly closes an open end of the housing. It includes terminals connected to two leads one of which is grounded and the other of which is connected to the above-described demodulator circuits. The terminals are connected to the end wires of the coil. In the illustrated embodiment the coil is energized by a constant alternating current source and has a winding which produces an alternating output voltage having the form: $v(t,z,T) = V(z,T)\sin[\omega + \alpha(z,T)]$ where t is time, z is distance and T is temperature. The demodulator output signal of the real component $V_R$ including the measured temperature has the form: $V = c + dz + eT$ where c is a constant dz is the position measurement and eT is the temperature measurement.

The demodulator output signal of the imaginary component of $V_I$ including the measured position has the form: $V = a + bz$ where b is a constant and bz is the position measurement.

The imaginary component $V_I$ varies continuously in amplitude in proportion to the movement of the core from its initial stroke position wholly within the coil and its end stroke position wholly within the coil.

Each demodulator includes an amplifier having a gain which switches synchronously with the reference voltage between plus and minus 1.0 depending on the state of an associated field effect switch. When the field effect switch is in the "on" state, the gain is +1.0; in its "off" state, the gain is −1.0. Each demodulator is followed by a first order filter and a buffer to prevent loading of the filter by external instrumentation. The demodulator for the imaginary component of the voltage generated across the coil winding has an adjustable phase shift circuit to accommodate various drive frequencies.

BRIEF DESCRIPTION OF THE DRAWINGS

Other advantages, features and objects of the present invention will be readily appreciated as the same becomes better understood by reference to the following detailed description when considered in connection with the accompanying drawings wherein:

FIG. 1 is a longitudinal sectional view of a two-wire transducer in accordance with the present invention;

FIG. 1A is an enlarged sectional view of the lead wire/coil wire connection in the transducer of FIG. 1.

FIG. 3 is a diagram of real and imaginary voltage components extracted by use of the present invention to produce combined temperature and position signals.

DETAILED DESCRIPTION OF THE PREFERRED EMBODIMENT

Figure 2:
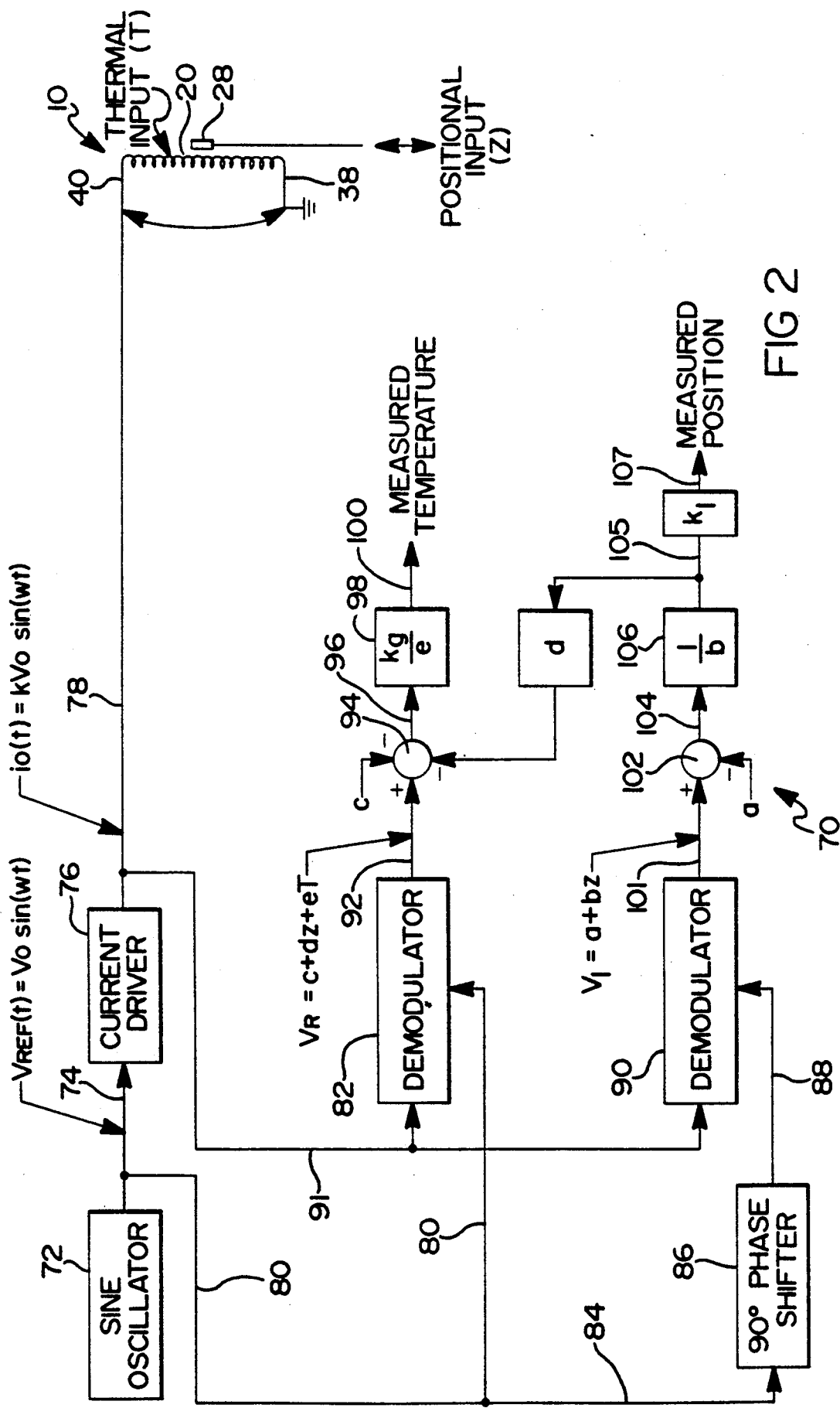
FIG. 2 is a circuit diagram of the transducer of FIG. 1 including associated circuits.

The construction of the transducer 10 is shown in FIG. 1. It includes a protective outer housing 12 with an end cap 14. A split ferromagnetic shield 16 is supported within a housing bore 18 to cover a coil in the form of a single winding 20. The single winding 20 is accurately applied to the outer surface 22 of a bore liner 24 made of magnetically non-permeable, electrically insulating material such as 310 stainless steel. The outer housing 12 and front end cap 14 are made of 304 stainless steel and a back end cap 26 which closes the inboard end of the bore liner 24 is made of 310 stainless steel.

A core 28 of magnetically permeable ferromagnetic material is located within the sealed bore liner 24. It is supported on the end of a quill 30 which is adapted to be connected to a mechanical system 32 whose motion constitutes the position input to the quill 30 for reciprocating the core 28 within the bore liner 24 between opposite ends thereof.

In accordance with the present invention the core 28 has a length which is selected to couple with different wire winding densities to change the inductance of the single winding 20 in accordance with the position of the core 28 within the bore liner 24. The core 28 has an initial position shown in dotted lines at 28a in FIG. 1 and a full stroke position shown in dotted lines at 28b in FIG. 1. The single winding is excited by a constant current as more specifically discussed in my copending U.S. Ser. No. 237,439 filed Aug. 29, 1988 entitled Two Wire Linear Transducer. Now U.S. Pat. No. 4,857,824, issued Aug. 15, 1989, a continuation-in-part application based upon U.S. Ser. No. 074,355 filed July 16, 1987.

The single winding 20 is unidirectionally wound with a variable pitch along the length of the bore liner 24 to vary the winding density to produce a resultant voltage across ends 34, 36 of the single winding 20 which has an amplitude proportional to the position of the core and which is linear for all positional inputs to the transducer 10. The ends 34, 36 are connected, respectively, to first and second lead wires 38, 40 constituting the two wires of the transducer 10 which are electrically connected to associated circuits to be described. The ends 34, 36 extend through the end cap 26 and are connected to the lead wires 38, 40 at a header assembly 42.

The header assembly 42 includes a wire guide 44 and wire retainer 46. The end plug 45 fits in the inboard end of the bore liner 24 as shown in FIG. 1. A retainer element 48 threads into plug 45 to lock the lead wires 38, 40 against the wire guide 44. Each coil wire end is wound on a lead wire to define a brazed connector joint 50 protected by a resilient protective coating 51 as shown in FIG. 1A.

A space 52 between the header assembly 42 and inwardly bent edge 54 around the closed end 56 of the housing 12 is filled with high temperature epoxy material. The retainer element 48 is metal and of a spider shape in end elevation to anchor each of the lead wires 38, 40 at a strain relieved interface on the transducer. Strain relief is provided to protect coil wire and coil wire/lead wire joint from damage resulting from external force applied to lead wires. Lead wires are mechanically anchored by the wire guide 44 and wire retainer 46.

The bore liner 24, end cap 26 and housing 12 are electron beam welded at interfaces 58, 60, 62 to produce an effective hermetic pressure barrier which will isolate the single winding 20 from the effects of pressure, humidity, chemical corrosion and magnetic fields of ordinary strength.

Referring now to FIG. 2, a schematic wiring diagram 70 is illustrated of associated control circuits for use with the above-described two wire transducer 10.

The wiring diagram 70 includes a sine oscillator 72 which is connected by a conductor 74 to a current driver 76. The current driver 76 has an output directed through a conductor 78 to one of the lead wires 40 which connects to the single winding 20 shown schematically in the wiring diagram 70. The opposite end of the single winding 20 is connected by the lead wire 38 to ground.

The diagram 70 shows the core 28 as the positional input (z) to the transducer 10 and the single winding 20 is shown as a thermal input (T).

The output of the sine oscillator 72 is also connected by a conductor 80 to a reference voltage input of a synchronous demodulator 82. The same output is also conducted across a conductor 84 to a 90 degree phase shifter 86. The phase shifted voltage signal is then directed across the conductor 88 to a reference voltage input of a synchronous demodulator 90.

As previously stated, the voltage produced across the single winding 20 by the output of the current driver 76 is an output voltage signal whose imaginary component changes proportionally with the position of the core 28 with respect to the single winding 20 and whose real component changes proportionally with temperature.

The voltage across the single winding 20 can be expressed as: $v(t,z,T) = V(z,T)\sin[\omega + \alpha(z,T)]$ where t is time, z is distance and T is temperature.

This voltage is applied through conductor 91 to an input to synchronous demodulator 82. Demodulator 82 operates to compare the reference voltage input on conductor 80 to the transducer voltage to extract the real voltage component of the voltage across the single winding 20.

The real voltage component is expressed as: $V = c + dz + eT$ where c and e are constants, z is the position measurement and T is the temperature measurement.

The voltage across the single winding 20 is also applied to a signal input to the demodulator 90 through conductor 91. Demodulator 90 operates to compare the reference voltage on conductor 88 with the transducer voltage to extract the imaginary voltage component of the voltage across the single winding 20.

The imaginary voltage component is expressed as: $V = a + bz$ where a and b are constants and z is the position measurement.

The real voltage output from the demodulator 82 is applied across a conductor 92 to a summing junction 94 which has a negative input constant c and a negative input value d so as to produce a resultant output on the conductor 96 processed by a divider 98 having an arbitrarily selected constant kg to determine the output scale of a measured temperature signal on conductor 100. The temperature signal on conductor 100 corresponds to the temperature of the single winding 20 which follows the temperature of the operating environment of the transducer 10.

The imaginary voltage output from the demodulator 90 is applied across a conductor 101 to a summing junction 102 having a negative input corresponding in value to constant a to produce an output signal on conductor 104 which is proportional to the measured position of the core 28. The measured position signal is inputted to a scaling network 106 for the expression 1/b.

The output of the scaling network or divider 106 is a position signal d. The position signal d is directed to the previously described summing junction 94 to extract the position value from the output of the demodulator 82 thereby to produce a resultant measured temperature signal on conductor 100. The position signal d is also processed through a circuit $K_1$ to establish the output scale of a measured position signal or conductor 107.

As shown in FIG. 3, the excitation current develops a total voltage shown by the vectors 110 a-c. which increase in value as the core 20 is positioned more inwardly of the bore liner 24. The single winding 20 is wound as a variable pitch coil such that the imaginary components of the voltage vector 110 are proportional to the position z of the non-contacting movable core 28 within the bore liner 24. The imaginary component of the voltage vector 110 is depicted in FIG. 3 by the vectors 112a-c showing the change in magnitude of the imaginary component for three core positions z1, z2, and z3.

The material of the variable pitch coil form of single winding 20 is selected such that the magnitude of the real voltage component is made highly temperature dependent and repeatable thus providing a convenient means of sensing the temperature of the environment in which the transducer 10 operates. A suitable material, in one representative application, is annealed copper. As is depicted in FIG. 3, the difference in the value of the real component for three different core positions is shown by the vectors 114a-c. The magnitude of the difference between each vector for each different core position is not as great as the difference in magnitude in the vectors 112a-c. Nevertheless, the differences are detectable when extracted by means of the demodulator 90 and associated circuitry to produce a reliable indicator of the operating temperature of the single winding 20 once the measured position expression is removed at the summing junction 86.

Figure 4:
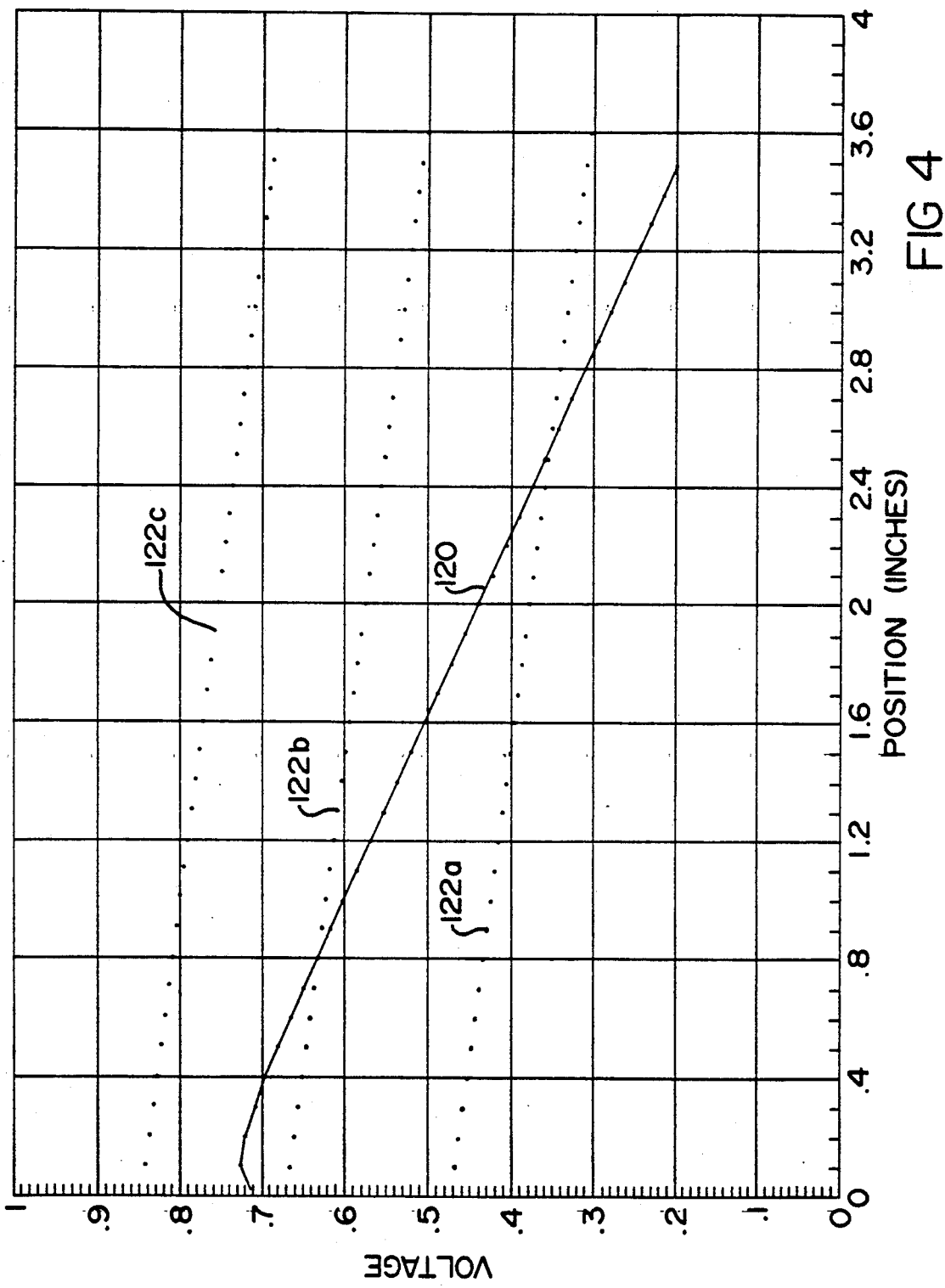
FIG. 4 is a graph with curves indicating the outputs of the present invention.

FIG. 4 shows actual test data from one prototype transducer 10. The curves 120 which are substantially coincident show the imaginary component (position) to exhibit more displacement gain and a lesser temperature gain for temperatures of 84, 156 and 368 degrees F., respectively, and have a substantial voltage gain as the core 28 is positioned into the single winding 20 which gain is insensitive to temperature. The curves 122a, b and c for the real component (temperature) for the same temperature differences show opposite characteristics, namely there is less voltage gain for each of the different temperature conditions at the different stroke positions of the core 28.

While a representative embodiment of the present invention has been illustrated and discussed, those skilled in the art will recognize that various changes and modifications may be made within the scope and equivalency of the described invention. It is therefore, to be understood that within the scope of the appended claims, the invention may be practiced otherwise than as specifically described.

What is claimed is:

1. A transducer for providing a measured transducer temperature signal and a measured position signal by use of:

a mechanical device having a position input means;

a drive rod coupled to said position input means operative to be moved linearly in response to said position input means; and a transducer having a winding on a bore liner and a finite length core of high permeability material located within said bore liner and adapted to be connected to said drive rod for linear movement within said bore liner characterized by:

a single coil wound on said bore liner having only two leads, said single coil being made from a material which produces an output voltage across the only two leads which is highly temperature dependent;

a finite length core of high permeability material located within said bore liner connected to said drive rod to be moved linearly within said bore liner;

said core being positioned by said drive rod at an initial position wholly within said bore liner to be electromagnetically coupled with first segments of said single coil to produce an initial signal corresponding to an initial position of said drive rod;

said single coil having a non-linear winding pattern between said only two leads, said core progressively electromagnetically coupling to said single coil as said core moves linearly within said bore liner so that movement of said core will produce a linear inductance variation across said leads which corresponds to the linear movement of said core within said bore liner;

means defining a constant alternating current source for exciting said single coil;

first circuit means for producing a first signal of the operating temperature of the transducer by processing the real component of the voltage across said single coil produced by inductive coupling of the reciprocating core and said single coil in accordance with the position that the core assumes within the single coil during operation of the transducer; and second circuit means for producing a second signal of the position of the core within said single coil including means for extracting the imaginary component of the voltage across the single coil produced by inductive coupling of the reciprocating core with said single coil in accordance with the position of the core within the single coil.

2. In the transducer of claim 1, said single coil having only two leads across which said first and second signals are generated;

said core having a length which is located fully within said bore liner for all positions of operation which length is related to the winding pattern of said single coil to produce a linear inductance variation for all positions of the core as it is stroked from an initial position aligned with one end of said single coil and from a final position aligned with the opposite end of said single coil and wherein the core remains fully positioned within said single coil throughout all of its stroke positions.

3. In the transducer of claim 1, said first circuit means including a first synchronous demodulator having a sine voltage reference;

said second circuit means including a second synchronous demodulator having a cosine voltage reference;

said first synchronous demodulator and said second synchronous demodulator each receiving the output voltage generated across said single coil as the core moves relative thereto and including means for comparing the output voltage generated across said single coil with said sine and cosine voltage references respectively to produce a first demodulated signal of the measured temperature of the transducer and a second demodulated signal of the measured position of said core and wherein the first demodulated signal includes a measured position of said core.

4. In the transducer of claim 1, a housing supporting said single coil around said bore liner;

a split ferromagnetic shield surrounding said bore liner for protecting said single coil;

means including said housing and an end cap means to hermetically seal said single coil.

5. In the transducer of claim 1, said housing having an open end;

a header assembly closing an open end of said housing;

said header assembly including terminals connected to two leads one of which is grounded and the other of which is connected to each of said first and second circuit means.

6. A transducer for providing a measured temperature signal and a measured position signal by use of:

a mechanical device having a position input means;

a drive rod coupled to said position input means operative to be moved linearly in response to said position input means; and a transducer having a winding on a bore liner and a finite length core of high permeability material located within said bore linear and adapted to be connected to said drive rod for linear movement within said bore liner characterized by:

a single winding wound on said bore liner having only two leads, said single winding being made from a material which produces an output voltage across the only two leads which is highly temperature dependent;

means defining a constant alternating current source for exciting said single winding;

first circuit means for producing a first signal of the operating temperature of the transducer by processing the real component of the voltage across said single winding produced by inductive coupling of the reciprocating core and said single winding in accordance with the position that the core assumes within the single winding during operation of the transducer; and second circuit means for producing a second signal of the position of the core within said single winding including means for extracting the imaginary component of the voltage across the single winding produced by inductive coupling of the reciprocating core with said single winding in accordance with the position of the core within the single winding;

said first circuit means including a first synchronous demodulator having a sine voltage reference;

said second circuit means including a second synchronous demodulator having a cosine voltage reference;

said first synchronous demodulator and said second synchronous demodulator each receiving the output voltage generated across the single winding as the core moves relative thereto and including means for comparing the output voltage generated across the single winding with said sine and cosine voltage references respectively to produce a first demodulated signal including the measured temperature of the transducer and a second demodulated signal of the measured position of the core and wherein the first demodulated signal includes a measured position of the core; and means for extracting the measured position from said second demodulated signal and means including a summing junction to subtract the extracted measured position from the output of the first demodulated signal to extract a signal of the temperature of the transducer.

7. A transducer for providing a measured temperature signal and a measured position signal by use of:

a mechanical device having a position input means;

a drive rod coupled to said position input means operative to be moved linearly in response to said position input means; and a transducer having a winding on a bore liner and a finite length core of high permeability material located within said bore liner and adapted to be connected to said drive rod for linear movement within said bore liner characterized by:

a single winding wound on said bore liner having only two leads, said single winding being made from a material which produces an output voltage across the only two leads which is highly temperature dependent;

means defining a constant alternating current source for exciting said single winding;

first circuit means for producing a first signal of the operating temperature of the transducer by processing the real component of the voltage across said single winding produced by inductive coupling of the reciprocating core and said single winding in accordance with the position that the core assumes within the single winding during operation of the transducer; and second circuit means for producing a second signal of the position of the core within said single winding including means for extracting the imaginary component of the voltage across the single winding produced by inductive coupling of the reciprocating core with said single winding in accordance with the position of the core within the single winding;

said first circuit means including a first synchronous demodulator having a sine voltage reference;

said second circuit means including a second synchronous demodulator having a cosine voltage reference;

said first synchronous demodulator and said second synchronous demodulator each receiving the output voltage generated across the single winding as the core moves relative thereto and including means for comparing the output voltage generated across the single winding with said sine and cosine voltage references respectively to produce a first demodulated signal including the measured temperature of the transducer and a second demodulated single of the measured position of the core and wherein the first demodulated signal includes a measured position of the core;

said constant alternating current source and said single winding producing an alternating output voltage having the form: $v(t,z,T) = V(z,T)\sin[\omega + \alpha(z,T)]$ where t is time, z is distance and T is temperature.

8. A transducer for providing a measured temperature signal and a measured position signal by use of:
   a mechanical device having a position input means;
   a drive rod coupled to said position input means operative to be moved linearly in response to said position input means; and
   a transducer having a winding on a bore liner and a finite length core of high permeability material located within said bore liner and adapted to be connected to said drive rod for linear movement within said bore liner characterized by:
   a single winding wound on said bore liner having only two leads, said single winding being made from a material which produces an output voltage across the only two leads which is highly temperature dependent;
   means defining a constant alternating current source for exciting said single winding;
   first circuit means for producing a first signal of the operating temperature of the transducer by processing the real component of the voltage across said single winding produced by inductive coupling of the reciprocating core and said single winding in accordance with the position that the core assumes within the single winding during operation of the transducer; and
   second circuit means for producing a second signal of the position of the core within said single winding including means for extracting the imaginary component of the voltage across the single winding produced by inductive coupling of the reciprocating core with said single winding in accordance with the position of the core within the single winding;
   said first circuit means including a first synchronous demodulator having a sine voltage reference;
   said second circuit means including a second synchronous demodulator having a cosine voltage reference;
   said first synchronous demodulator and said second synchronous demodulator each receiving the output voltage generated across the single winding as the core moves relative thereto and including means for comparing the output voltage generated across the single winding with said sine and cosine voltage references respectively to produce a first demodulated signal including the measured temperature of the transducer and a second demodulated signal of the measured position of the core and wherein the first demodulated signal includes a measured position of the core;
   said first synchronous demodulator having an output signal representing a real voltage component having the form; $V - c + dz + eT$ where c is a constant, dz is a position measurement and eT is a temperature measurement;
   said second synchronous demodulator having an output signal representing an imaginary component having the form; $V = a + bz$ where a is a constant and bz is the position measurement.

* * * * *